Feb. 11, 1941.  C. POLSTRA  2,231,025
COUPLING
Filed March 21, 1940
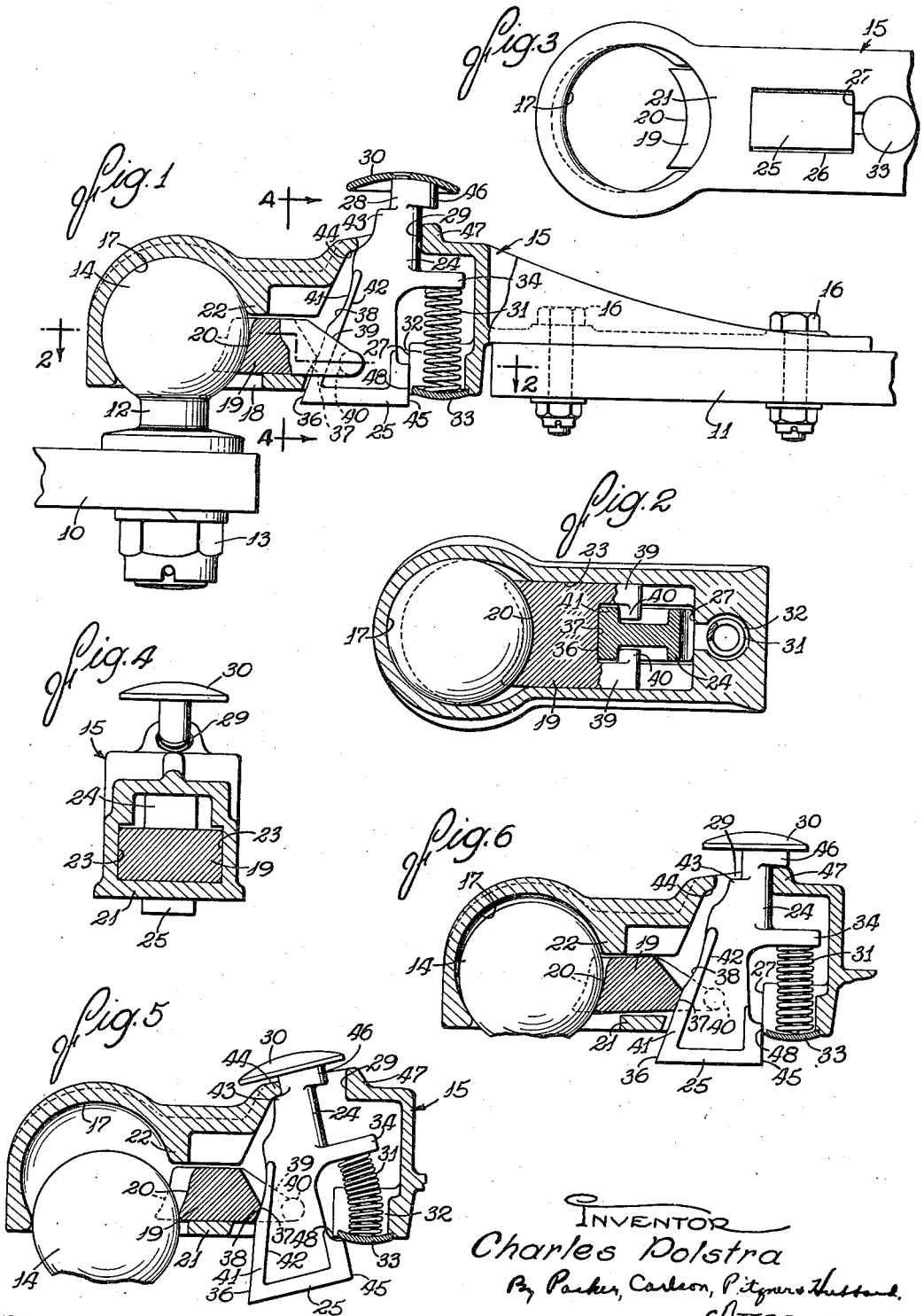
INVENTOR
Charles Polstra
By Parker, Carlson, Pitzner Hubbard
ATTORNEYS Patented Feb. 11, 1941

2,231,025

UNITED STATES PATENT OFFICE 2,231,025

COUPLING

Charles Polstra, Rockford, Ill.

Application March 21, 1940, Serial No. 325,103

13 Claims. (Cl. 280—33.17)

This invention relates to couplings particularly adapted to detachably connect tractor and trailer vehicles, and the general object is to provide a new and improved coupling which is of simple and very rugged construction, which is positive and reliable in operation, and which is convenient to condition for coupling and uncoupling of the vehicles.

Another object is to provide a female coupling element having a movable coupling jaw thereon actuated in a novel manner which is conducive to reliability in service use and low manufacturing cost.

A further object is to provide a trailer coupling in which the interengaging parts are held in firm contact so as to prevent rattling during normal use but are adapted to yield slightly under abnormal stress without, however, becoming fully disengaged.

The invention also resides in the novel manner of actuating the movable coupling jaw and latching it in released position.

Other objects and advantages of the invention will become apparent from the following detailed description taken in connection with the accompanying drawing, in which Figure 1 is a longitudinal vertical sectional view of the improved coupling, the male element of which is shown in elevation.

Fig. 2 is a fragmentary plan section taken along the line 2—2 of Fig. 1.

Fig. 3 is a fragmentary bottom view.

Fig. 4 is a section taken along the line 4—4 of Fig. 1.

Figs. 5 and 6 are fragmentary views similar to Fig. 1 illustrating different positions of the parts.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

The invention is shown in the drawing as a coupling for connecting draw bars 10 and 11 which in the case of two wheel trailers are mounted rigidly on the tractor and trailer vehicles. The male coupling element comprises a king pin 12 usually clamped by a nut 13 to the tractor draw bar and having a head 14 which preferably is spherical to permit of universal relative swiveling of the two bars. To reduce manufacturing costs, the element 12 is usually formed as a casting so that the head 14 may have some surface irregularities.

In the present instance, the other coupling element comprises an elongated casting 15 the rear end of which is attached at spaced points to the trailer draw bar as by bolts 16. At its forward end, the casting has a downwardly opening socket recess defined by a wall 17 complemental in shape to that of the king pin head. On its rear side, the recess is enlarged as indicated at 18 so as to provide an opening of larger diameter than the ball head thereby permitting proper entry and withdrawal of the latter.

The hollow intermediate portion of the casting 15 houses a horizontally slidable jaw 19 which projects forwardly into the rear of the socket recess and has a concave surface 20 on its forward end shaped to fit around the ball 14 and cooperating with the wall 17 to form a socket for the ball. Herein, the jaw rests on a cross bar 21 constituting an integral part of the casting 15 and is guided by the top wall 22 and the side walls 23 of the opening through which the jaw projects. To permit of some degree of bodily tilting under conditions that will be described later, the jaw fits very loosely between the bar 21 and the wall 22 (see Figs. 1 and 6).

When the jaw is projected forwardly as shown in Fig. 1, it engages the rear side of the ball 14 and underlies the latter sufficiently to hold the ball in the socket while permitting the desired relative swiveling of the coupling elements. By full retraction of the jaw (see Fig. 5), the lower end of the coupling socket is enlarged sufficiently to permit withdrawal of the ball from or reentry thereof into the socket.

A manually operable member 24 housed within the casting 15 and supported for bodily vertical movement and also for pivotal movement is utilized to actuate the jaw 19 and also to act as a latch for holding the jaw released while the parts are uncoupled. This member comprises a casting, the enlarged lower end 25 of which projects through an opening in the bottom of the casting 15 and is guided in its vertical movements by the side and rear walls 26 and 27 of the opening. The upper end 28 of the member projects through a top opening 29 in the hollow casting and has attached thereto a disk-shaped knob 30 by which the member may be actuated manually. A coiled compression spring 31 is disposed in a recess 32 in the casting 15 and acts between a plug 33 closing the bottom of the recess and a lug 34 projecting rearwardly from the member 24. The spring thus urges the member upwardly and at the same time tends to tilt its upper end forwardly about a fulcrum defined by the point of engagement of the walls 27 and a vertical back surface 45 on the member 24.

The jaw 19 is shifted forwardly and held in locking engagement with the ball 14 by a cam surface 36 on the forward edge of the member 24. This surface is inclined forwardly and downwardly at an angle of the magnitude described later and acts as an open face cam on the rear end surface 37 of the jaw 19. Thus, as the member is raised by the spring to normal coupled position (Fig. 1), the surface 36 cams the jaw forwardly against the ball, thereby taking up any looseness between the parts so as to prevent rattling of the coupling in normal service use. Due to the comparatively small incline of the cam surface 36 and the fact that the upright rear surface 45 of the member is backed rigidly by the walls 27, the coupling socket will be held closed effectively around the ball as shown in Fig. 1 under any normal stresses encountered in ordinary service use. Any wear on the ball or jaw is taken up automatically by the action of the spring on the cam member.

When the knob 30 is fully depressed, the effective surface of the cam retracts and a depressed portion 38 of the cam is presented to the jaw permitting the jaw to shift rearwardly far enough to release the ball (Fig. 5).

To latch the jaw retracted so as to permit withdrawal of the ball and facilitate entry of the ball to recouple the elements together, the cam 36 and the lower part of the forward edge of the member are disposed between arms 39 projecting rearwardly from the jaw 19 and carrying inturned lugs 40 which project in behind ribs 41 along the sides of the cam to form a relatively loose pivotal connection. As the member 24 is depressed preparatory to uncoupling, the rear surfaces 42 of the ribs, acting on the lugs 40, cam the jaw rearwardly far enough to permit partial withdrawal of the ball. The latter, while it is being withdrawn from the socket, usually by raising of the draw bar 11, cams the jaw further backwardly into the depressed part 38 of the cam (Fig. 5).

In such depression of the member 24, its upper end is urged forwardly by the spring 31. Thus, a lug 43 on the member, as it passes beneath a pawl defined by a shoulder 44 rigid with the casting 15 at the forward edge of the top opening 29, moves in under the shoulder (Fig. 5) where it is held under spring effect to latch the member in jaw-released position. The ball may then be withdrawn from the socket. Normally, the member 24 remains in this position until the ball is reentered preparatory to coupling the vehicles together. After this has been done, the knob 30 is depressed slightly and simultaneously moved rearwardly whereupon the spring 31 will raise the member 24 as the lug 43 passes the shoulder 44. As an incident to this, the jaw will be cammed forwardly by the surface 36, coupled relation of the parts (Fig. 1) being thereby restored.

With the coupling elements thus engaged, the ball 14 is held positively against withdrawal from the socket, the jaw 19 bearing against the surface 36 of the rigid wedge member 24 and the latter being backed firmly by the walls 27 of the latch recess. The normal engagement between the surfaces 36 and 37 occurs at the upper end of the latter as shown in Fig. 1 owing to the different inclinations of the two.

Under certain conditions, the jaw 19 may be subjected to very severe stresses. For example, inherent irregularities on the ball surface especially when the latter is not machined may result in a wedging action during swiveling of the parts that applies an abnormal pressure to the face of the jaw. When constructed and mounted as above described, the jaw is adapted to yield sufficiently to relieve the pressure without at the same time permitting release of the ball from its socket. The positions assumed by the parts under such conditions are illustrated in Fig. 6. The ball has shifted in its socket and applied a downwardly directed force to the jaw so as to tilt the latter slightly and bring the surface 37 into full contact with the cam surface 36. Owing to the location and inclination of the cam surface 36, the line of action of the force applied to the cam member is substantially above the lower ends 48 of the walls 27 with the result that the upper end of the member is urged rearwardly. The cam surface 36 is inclined at an angle to the vertical substantially greater than the angle of friction for the metals used and such that, even when these surfaces are not machined, the vertical component of the force applied to the member shifts the latter downwardly against the action of the spring 31. This movement, however, is limited by engagement between a lug 46 formed on the latch member 24 immediately below the knob 30 and a flange 47 around the opening 29. As a consequence, the jaw yields somewhat under abnormal stresses but the movement is positively limited to a position short of that at which the ball 14 is released from the socket. The inclination of the surface 36 necessary in order to obtain this desirable yielding action will, of course, vary with the character and smoothness of the coacting cam surfaces. With cast iron parts unmachined, satisfactory results have been attained when the surface 36 is inclined as shown at approximately twenty-three degrees to the vertical.

From the foregoing, it will be seen that the cam or jaw actuating member 24 is mounted for pivotal movement about the fulcrum 48 as well as for bodily sliding movement along the two abutments provided by the walls 27 and face of the flange 47. Such dual motion permits the member to perform the additional functions of latching the jaw in active position by engaging the shoulder 44 and of limiting the yieldable retraction of the jaw by engagement of the lug 46 and the flange 47. As a result, the female coupling element is composed of only three parts, namely, the body 15, the jaw 19, and the latch 24, all of which may comprise simple castings that may be produced at a low cost and need not be machined. At the same time, the parts act positively and reliably to insure against accidental uncoupling of the vehicles under all conditions encountered in service use and to greatly facilitate uncoupling and recoupling of the vehicles.

This application is a continuation in part of my copending application Serial No. 275,621, filed May 25, 1939.

I claim as my invention:

1. A vehicle coupling having, in combination, a king pin having a ball-shaped head, a coacting coupling element having a recess for receiving the head of said king pin, a jaw slidable on said element generally transversely of the pin axis and having an end projecting into said recess and coacting with said element to form a swiveling socket for said head, a member bodily slidable on said element in a direction generally longitudinally of said axis, said member also being tiltable relative to said element, two cam surfaces on said member acting on said jaw, one operating during movement of the member in one direction to force the jaw against said head and the other operating to retract the jaw during reverse movement of the member, spring means urging said member in said first mentioned direction, a pawl rigid with said element and engageable with said member upon tilting thereof while in jaw-releasing position to latch the member in such position, and a knob on said member by which the member may be actuated manually.

2. A vehicle coupling having, in combination, a king pin, a coacting female coupling element having a socket for receiving the head of said king pin, a jaw engageable with said head and bodily slidable on said element generally transversely of the pin axis to lock the head in said socket or release the pin, a manually shiftable member bodily slidable on said element in a direction generally longitudinally of said axis and having a cam surface acting on said jaw to move the latter between locking and releasing positions, spring means urging said member toward said locking positions to advance said jaw, and means rendered active automatically as an incident to release of said jaw to hold said member in jaw-releasing position.

3. A coupling having, in combination, a king pin, a coacting coupling element having a socket, a jaw engageable with said king pin and bodily slidable on said element, a pawl on said element, a manually shiftable member mounted on said element for bodily movement to actuate said jaw and for pivotal movement to engage and disengage said pawl, and a single coiled compression spring acting on said member and urging the same bodily in a direction to force said jaw against said pin and pivotally in a direction to engage said pawl.

4. A coupling having, in combination, a king pin, a coacting coupling element having a socket for receiving the head of said king pin, a jaw slidable on said element and engageable with said head to hold the head in said socket, a manually operable member bodily shiftable on said element transversely of the direction of movement of said jaw to cam the jaw against said head, means on said element providing a rigid backing for said member when in wedged position, a spring urging said member toward wedged position, and means on said element coacting with said member when the latter is shifted against the action of said spring to latch the member in jaw-releasing position.

5. A coupling having, in combination, a king pin, a coacting coupling element having a socket for receiving the head of said king pin, a jaw on said element movable into locking engagement with said head, a member mounted on said element for bodily movement and also for pivotal movement, a cam operable during shifting of said member in one direction to move said jaw toward said king pin head, spring means urging said member in such direction, and a pawl engageable with said member upon reverse shifting and pivoting of the member to latch the latter in jaw-releasing position.

6. A coupling having, in combination, a king pin, a coacting coupling element having a socket for receiving the head of said king pin, a jaw bodily slidable on said element into engagement with said head, a wedge on said element engaging said jaw and manually movable in one direction to release the jaw and also in a transverse direction, spring means urging said wedge to shift it in a direction to force said jaw toward said head, and a stationary shoulder on said element engageable with said wedge after shifting thereof in said transverse direction following release of said jaw.

7. In a coupling, the combination of, a coupling element having a socket recess, a jaw projecting into said recess, a pawl rigid with said element, a wedge mounted on said element for bodily movement operable to actuate said jaw and also pivotal movement to engage said pawl and become latched in jaw-released position.

8. A coupling having, in combination, an upstanding king pin, a coacting coupling element having a downwardly opening socket for receiving said king pin, a movable jaw on said element engageable with said pin, a member mounted on said element for bodily vertical movement and having its upper end upstanding from the element and constituting a handle, cam means on said member operable during lowering of said member to retract said jaw and release said pin, spring means urging said member upwardly, and means on said element engageable with said member after shifting thereof to latch the member in jaw-released position.

9. A coupling having, in combination, a king pin, means providing a socket for said pin, a jaw movable into said socket to hold the king pin therein, a manually operable member engageable with said jaw to lock said pin in said socket or release the same therefrom, spring means normally urging said member and jaw in a direction to engage said pin and thereby take up looseness in the coupling while permitting of yieldable retraction of the jaw and member under abnormal stresses, and means normally acting on said member to limit such retraction of the jaw short of the position in which said pin is released.

10. A coupling having, in combination, a king pin with a spherical head, means providing a socket for said head, a movable jaw engageable with said head to hold the same in said socket, a manually operable member movable transversely of said jaw and engageable with the latter to lock said pin in said socket or release the same therefrom, spring means normally urging said member in a direction to engage said jaw and said head and thereby take up looseness in the coupling while permitting of yieldable retraction of the jaw and member under abnormal stresses, and means normally acting on said member to limit such retraction of the jaw short of the position in which said head is released from said socket.

11. A coupling having, in combination, a king pin with an enlarged head, means providing a socket for receiving said head, a jaw movable transversely of the pin axis and into and out of said socket to engage and release said head, an abutment spaced from said jaw and extending generally parallel to said axis, a wedge member slidable along and backed by said abutment, coacting cam surfaces on said jaw and member acting during movement of the member in one direction to shift the jaw into said socket, and spring means urging said member in the latter direction, the inclination of said cam surfaces being such as to permit retraction of said jaw and said member when abnormal stresses are applied to said jaw by said head.

12. A coupling having, in combination, a king pin with an enlarged head, means providing a socket for receiving said head, a jaw member movable transversely of the pin axis and into and out of said socket, abutments spaced from said jaw and extending along a line generally parallel to said axis, a wedge member slidable along and backed by said abutments, a cam surface on one of said members acting during movement of the wedge member in one direction to shift the jaw member into said socket, and spring means urging said wedge member in the latter direction, the inclination of said cam surface being such that the line of action of a force exerted on said wedge member by said jaw member extends between said abutments.

13. A coupling having, in combination, a king pin with an enlarged head, means providing a socket for receiving said head, a jaw member movable transversely of the pin axis and into and out of said socket, an abutment spaced from said jaw and extending generally parallel to said axis, a member slidable along and backed by said abutment, coacting cam surfaces on said jaw and member acting during movement of the member in one direction to shift the latter into said socket, spring means urging said member in the latter direction, the effective inclination of said cam surfaces being such as to cause retraction of said jaw and said member when abnormal stresses are applied to said jaw by said head, and means limiting the movement of said member under such stresses to a position in which said head is still retained in said socket.

CHARLES POLSTRA.